United States Patent
Seidel et al.

(10) Patent No.: US 11,929,639 B2
(45) Date of Patent: Mar. 12, 2024

(54) DEVICE FOR UNINTERRUPTIBLE SUPPLY OF POWER, COMPRISING AN ENERGY STORAGE MEANS AND A ROTATING ELECTRIC MACHINE

(71) Applicant: Piller Group GmbH, Osterode (DE)

(72) Inventors: Detlev Seidel, Goettingen (DE); Armin Klauenberg, Osterode (DE)

(73) Assignee: PILLER GROUP GMBH, Osterode (DE)

( * ) Notice: Subject to any disclaimer, the term of this patent is extended or adjusted under 35 U.S.C. 154(b) by 164 days.

(21) Appl. No.: 17/673,379

(22) Filed: Feb. 16, 2022

(65) Prior Publication Data
US 2022/0173611 A1 Jun. 2, 2022

Related U.S. Application Data

(63) Continuation of application No. PCT/EP2020/074917, filed on Sep. 7, 2020.

(30) Foreign Application Priority Data

Sep. 5, 2019 (DE) ...................... 10 2019 123 864.1

(51) Int. Cl.
*H02J 9/06* (2006.01)
*H02K 3/28* (2006.01)

(52) U.S. Cl.
CPC .............. *H02J 9/066* (2013.01); *H02J 9/062* (2013.01); *H02K 3/28* (2013.01)

(58) Field of Classification Search
CPC ...................................................... H02J 9/066
USPC .......................................................... 307/64
See application file for complete search history.

(56) References Cited

U.S. PATENT DOCUMENTS

| | | | | |
|---|---|---|---|---|
| 4,412,170 A | * | 10/1983 | Roesel, Jr. ............. | H02K 7/025 307/64 |
| 6,023,152 A | | 2/2000 | Briest et al. | |
| 6,150,731 A | | 11/2000 | Rinaldi et al. | |
| 2001/0009338 A1 | * | 7/2001 | Reutere ................... | H02J 9/062 307/68 |
| 2005/0012395 A1 | | 1/2005 | Eckroad et al. | |

(Continued)

FOREIGN PATENT DOCUMENTS

| | | |
|---|---|---|
| DE | 19715468 C1 | 10/1998 |
| DE | 10002583 A1 | 8/2001 |
| DE | 102013204255 A1 | 9/2014 |

(Continued)

OTHER PUBLICATIONS

Written Opinion of the ISA in co-pending related PCT Application No. PCT/EP2020/074917 dated Nov. 12, 2020.

*Primary Examiner* — Joseph Chang
(74) *Attorney, Agent, or Firm* — Thomas | Horstemeyer, LLP

(57) ABSTRACT

An apparatus for uninterruptible power supply (UPS) comprises a rotating electric machine having a generator winding and a plurality of motor windings. The motor windings of the plurality of motor windings are electrically insulated from the generator winding and from one another. The UPS further comprises, for each motor winding, an energy storage for electric energy and an inverter which outputs an alternating current and via which the energy storage is connected to the respective motor winding.

20 Claims, 2 Drawing Sheets

(56) References Cited

U.S. PATENT DOCUMENTS

2015/0381084 A1   12/2015   Findeisen et al.
2017/0163114 A1    6/2017   Gieras et al.

FOREIGN PATENT DOCUMENTS

EP          3179614 A1   6/2017
EP          3480914 A1   5/2019

\* cited by examiner

DEVICE FOR UNINTERRUPTIBLE SUPPLY OF POWER, COMPRISING AN ENERGY STORAGE MEANS AND A ROTATING ELECTRIC MACHINE

CROSS REFERENCE TO RELATED APPLICATIONS

This application is a continuation to international application PCT/EP2020/074917 entitled "Device for uninterruptible supply of power, comprising an energy storage means and a rotating electric machine" filed on Sep. 7, 2020 and claiming priority to German patent application No. 10 2019 123 864.1 entitled "Vorrichtung zur unterbrechungsfreien Stromversorgung mit einem Energiespeicher und einer rotierenden elektrischen Maschine" and filed on Sep. 5, 2019.

FIELD OF THE INVENTION

The invention relates to an apparatus for uninterruptible power supply.

More particular, the invention relates to an apparatus for uninterruptible power supply comprising a rotating electric machine having a generator winding and a motor winding which is electrically insulated from the generator winding, and at least one energy storage for electric energy which is connected to the at least one motor winding via an inverter outputting an alternating current.

By means of such an apparatus for uninterruptible power supply (UPS), it is not only possible to at least temporarily supply an electric load with electric power in case of breakdown of a supply grid. If the generator winding is, for example, connected to a tap of a grid choke between the supply grid and the load, the apparatus also enhances the quality of the energy supply of the load by the supply grid in that it levels voltage variations of the supply grid.

When the UPS overtakes the power supply of the load in case of a breakdown of the supply grid, it takes the required electric energy out of the energy storage. Even in switching-on the energy storage, there in a positive effect of the enhancement of the quality of the power supply by the rotating electric machine.

BACKGROUND OF THE INVENTION

A product UBTD+ of the applicant is an UPS comprising a rotating electric machine having a generator winding and a motor winding which is electrically insulated from the generator winding, and at least one energy storage for electric energy which is connected to the at least one motor winding via an inverter outputting an alternating current. The generator winding is provided for connection to a tap of a grid choke, which is closer to the load to be supplied than to the supply grid.

Either a fly wheel or a battery is connected as an energy storage to the generator winding via the inverter. The rotor of the electric machine can also be coupled to a diesel motor to be able to supply the load with electric energy not only for a short term but also over longer periods of time. The respective energy storage may be charged out of the supply grid via the generator winding and the motor winding. For this purpose, the inverter via which the energy storage is connected to the motor winding has to be made bi-directional, and, during the charge process, the generator winding is used as a motor winding and the motor winding is used as a generator winding. However, it is also possible to charge the energy storage via a further inverter directly out of the supply grid. In the known UPS, the generator winding and the motor winding are designed for low voltages of less than 1,000 V, typically of about 600 V. If the known UPS is connected to a medium voltage grid, a transformer is connected between the generator winding and the grid choke. The known product UBTD+ may provide powers of up to 3,000 kW. In order to cover a higher demand of power, several such products are connected in parallel, wherein the electric powers provided by the individual UPSs have to be coordinated.

There still is the need of an apparatus for uninterruptible power supply of the kind described at the beginning which is suitable for providing higher electric powers and furthermore also for direct connection to a medium voltage grid.

SUMMARY OF THE INVENTION

The present invention relates to an apparatus for uninterruptible power supply (UPS). The UPS comprises a rotating electric machine having a generator winding and a plurality of motor windings which are electrically insulated from the generator winding and from one another, and, for each motor winding, an energy storage for electric energy and an inverter outputting an alternating current, wherein the energy storage is connected to the respective motor winding via the inverter.

The present invention also relates to a device for uninterruptible power supply. The device comprises a rotating electric machine having a generator winding and a plurality of motor windings which are electrically insulated from the generator winding and fro one another, and, for each motor winding, an energy storage for electric energy and an inverter outputting an alternating current, wherein the energy storage is connected to the respective motor winding via the inverter. The motor windings of the plurality of motor windings are equal. The generator winding, the motor windings of the plurality of motor windings and the inverters connected thereto are three-phase. The inverters connected to the motor windings of the plurality of motor windings are synchronized; and the generator winding has at least ten times as many windings per phase as the motor windings of the plurality of motor windings.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components of the drawings are not necessarily to scale, emphasize instead being placed upon clearly illustrating the principles of the present invention. In the drawings, like reference numerals designate corresponding parts throughout the several views.

DETAILED DESCRIPTION

Figure 1:
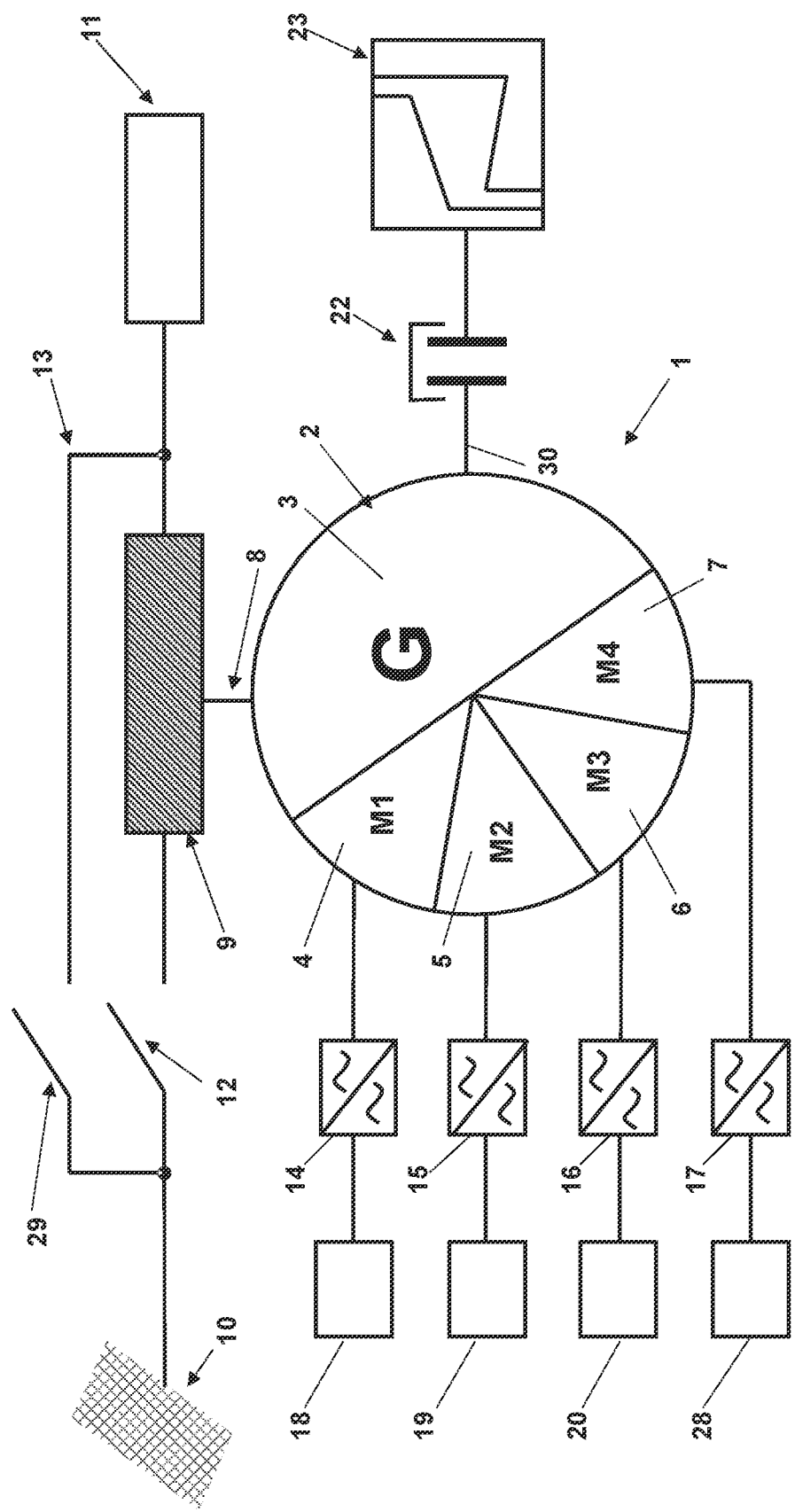
FIG. 1 is a schematic single line circuit diagram of a first embodiment of an apparatus according to the invention for uninterruptible power supply.

In an apparatus for uninterruptible power supply (UPS), a rotating electric machine comprises a generator winding and several motor windings which are electrically insulated from the generator winding and from one another. For each motor winding, an energy storage for electric energy and an inverter outputting an alternating current, via which the energy storage is connected to the respective motor winding, are provided.

In that the UPS comprises several energy storages at several motor windings, which are each connected via an inverter, the electric power of the UPS can be multiplied using hitherto used energy storages, i.e. without increasing the power of the individual energy storages. The inverters and motor windings assigned to the individual energy storages may also remain the same. There is no need to configure them for a higher power than hitherto. Essentially, only the generator winding has to be adapted to the higher power. Because the electric power flowing via the generator winding no longer needs to flow via an inverter but may directly or via a grid choke flow to the load to be supplied, this can be handled with known means. Instead of multiplying all of its components, the higher electric power of the new UPS is achieved by only multiplying its motor windings and its energy storages inclusive of the associated inverters.

In the UPS, the several motor windings are preferably equal or equivalent. The connected energy storages as well as the inverters which connect the energy storages to the motor windings may also be equal or at least equivalent. With an equal configuration of the individual energy storages, these energy storages may all be controlled in a similar way. Generally, however, it is also possible to combine different energy storages in the UPS, like, for example, a flywheel which here always refers to the flywheel inclusive of its electric machine, and a battery to provide electric power very quickly on the one hand and for a longer term on the other hand, or to protect the battery against power variations.

In a same way as the generator winding, the motor windings and the inverters of the UPS connected thereto may each be single phase or three-phase. Generally, a two-phase configuration or a mixture of differently phased motor windings is also possible. However, a uniform single phase or three-phase configuration is preferred. Whether a single phase or a three-phase configuration is more suitable depends on the electric power of the individual energy storages. For a higher electric power, a three-phase configuration of the individual motor windings is more suitable due to the lower current through the individual phase windings at a same voltage. The individual motor windings of the UPS may be configured for current feed at offset phases or synchronous phases. With a current feed at offset phases, the even speed of the rotating electric machine can be optimized. Motor windings for a current feed at synchronous phases may result in a more simple overall construction of the rotating electric machine.

Corresponding to the configuration of the motor windings, the individual inverters of the plurality of energy storages of the UPS have to be synchronized with or without a phase offset.

In the UPS, it is particularly preferred, if the rotating electric machine is configured as a rotating transformer which transforms a motor alternating voltage present across the motor windings into an at least three times as high generator alternating voltage present across the generator winding. The transformation ratio may even be at least five or at least ten. The transformation ratio of the rotating electric machine of the UPS is indicated by the fact that the generator winding has at least three times or at least five times or at least ten times as many windings per phase as each of the motor windings.

The UPS may particularly be designed such that the inverters provide low voltages as motor alternating voltages at the motor windings and that the electric machine outputs a medium voltage as a generator alternating voltage at the generator winding. Thus, the generator winding may be directly connected to a medium voltage grid even without a transformer.

Besides the transformation, the electric machine of the UPS may also effect a frequency conversion between the motor windings and the generator winding. Thus, for example, the inverters may each be designed for motor alternating voltages of 400 Hz which are reduced by the rotating electric machine to a generator alternating voltage of 50 Hz.

As already mentioned, the generator winding is typically connected to a tap of a grid choke which is connectible between a supply grid and a load to be supported, wherein the tap, as a rule, is closer to the load than to the supply grid.

Particularly, the grid choke may be a medium voltage grid choke which is connectible between a medium voltage grid and a medium voltage load.

In detail, the electric machine of the UPS may comprise a synchronous machine having a common stator onto which the several motor windings and the generator winding are wound and a brushlessly excited rotor common for the motor windings and the generator winding. Due to the different motor windings, the electric machine is a custom machine. However, each individual winding may have a conventional design.

As already indicated, the energy storages may, for example, include static energy storages, like for example batteries, and rotating energy storages, like for example flywheels. In this context, supercapacitors also belong to the batteries. In any case, the present disclosure is not limited to a certain kind of energy storage. Particularly, there is no need that the energy storages provide a direct voltage which is then inverted into an alternating voltage by the associated inverter. The energy storage may also supply an alternating voltage, like for example a flywheel with an electric machine in form of an alternating voltage generator.

In the UPS, a coupling may be provided via which an output shaft of a combustion engine can be coupled to the rotor of the electric machine to operate the electric machine driven by the combustion engine as a generator for longer terms than it would be possible out of the energy storages connected to the motor windings.

Now referring in greater detail to the drawings, the apparatus 1 for uninterruptible power supply (UPS) 1 depicted in FIG. 1 includes a rotating electric machine 2 as a central element. The rotating electric machine 2 has a generator winding 3 or G and, in the present case, four motor windings 4 to 7 or M1 to M4. The generator winding 3 and the motor windings 4 to 7 are electrically insulated from one another, and they may be single phase or multi-phase windings. Typically, both the generator winding 3 and each of the motor windings 4 to 7 are three-phase windings. The windings 3 to 7 are wound onto a common stator of the electric machine 2. The generator winding 3 is coupled with the motor windings 4 to 7 via a rotor 30 of the electric machine 2. The electric machine 2 is designed as a rotating transformer which upwardly transforms a motor alternating voltage present at the motor windings 4 to 7 in the lower voltage range of, for example, 600 V into a generator alternating voltage at the generator winding 3 in the medium voltage range of, for example, 10 kV. Thus, the electric machine 2 is provided for connection to a tap 8 of a medium voltage grid choke 9. The medium voltage grid choke 9 is connected between a medium voltage supply grid 10 and a medium voltage load 11. The tap is closer to the medium voltage load 11 than to the supply grid 10, and a disconnect switch 12 which has to be open in case of a breakdown of the medium voltage supply grid 10 is on that side of the medium voltage grid choke 9 facing towards the medium voltage supply grid 10. In an optional bypass 13 bypassing the medium voltage grid choke 9, a bypass switch 29 for activating and deactivating the bypass is provided. In grid operation, the grid alternating voltage of the medium voltage grid 10 is present at the generator winding 3 even if only the bypass switch 29 is closed. Then, the generator winding 3 serves as a motor winding for the electric machine 2. Using the motor windings 4 to 7 as generator windings, energy storages 18 to 21 for electric energy may be charged via bidirectional AC/AC-inverters 14 to 17. This electric energy is then available in case of a breakdown of the supply grid 10. Depending on the type of the energy storage, the inverters 14 to 17 may alternatively be DC/AC-inverters. Here, the AC/AC-inverters are adapted to rotating energy storages 18 to 21 in form of electric machines with flying masses coupled to their rotors. In case of a breakdown of the supply grid 10, the electric energy out of the energy storages 18 to 21 is fed into the motor windings 4 to 7 via the associated inverters 14 to 17, and supplied to the load 11 via the generator winding 3 and the medium voltage grid choke 9. Additionally, a combustion engine 23 can be coupled to the rotor 30 of the electric machine 2 via a coupling 22 to be able to even bridge longer term breakdowns of the supply grid 10 by means of the UPS 1. Due to the plurality of the motor windings 4 to 7 and the connected energy storages 18 to 21 the power of the UPS 1 is multiplied as compared to a single motor winding with a single energy storage. At the same time, the electric machine designed as a rotating transformer replaces an additional static transformer to transform the input side lower voltage of the electric machine 2 into an output side medium voltage.

Figure 2:
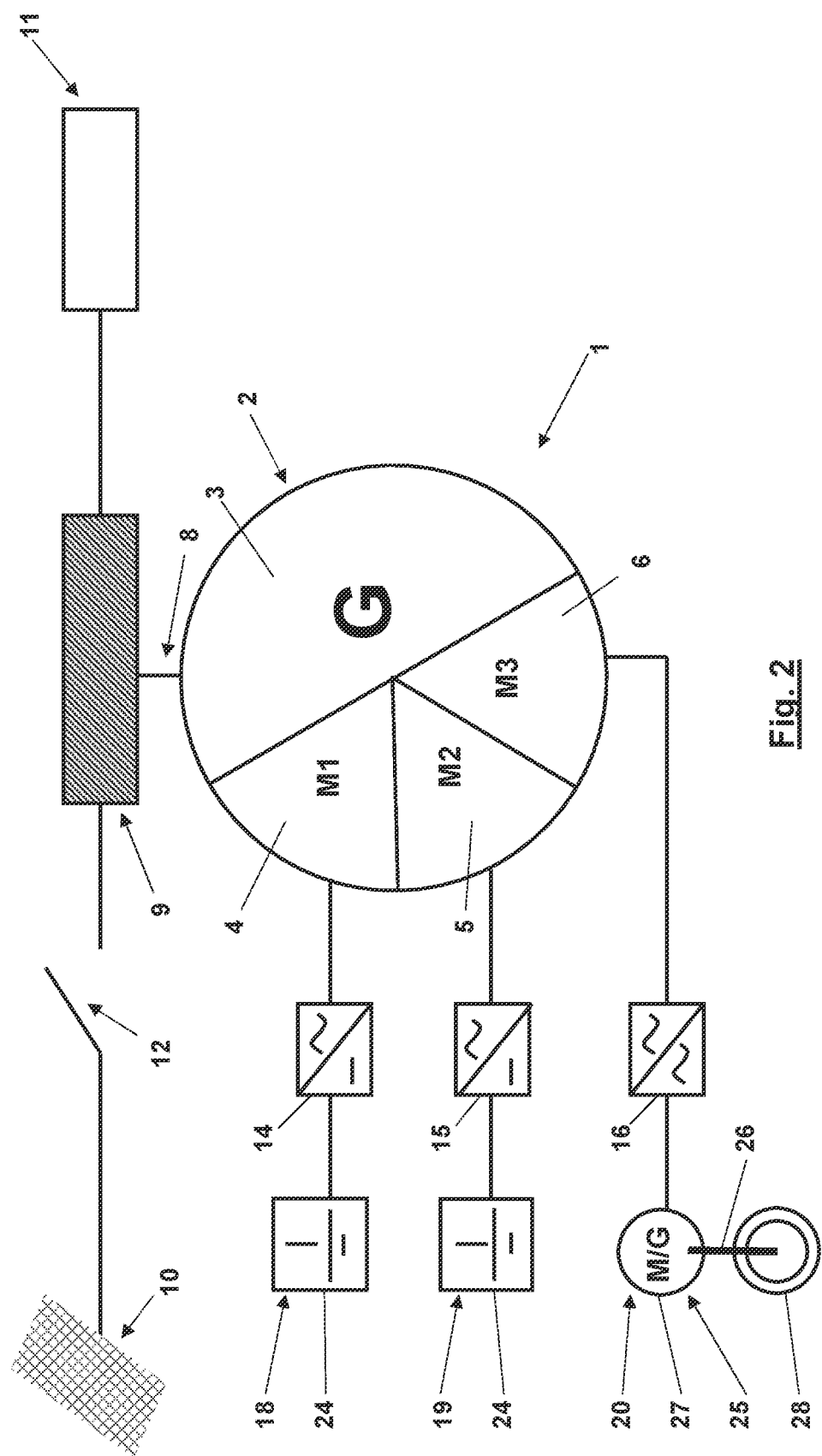
FIG. 2 is a schematic single line circuit diagram of a second embodiment of the apparatus according to the invention.

The embodiment of the UPS 1 depicted in FIG. 2 differs from the embodiment according to FIG. 1 with regard to the following details. The electric machine 2 does not comprise four but three motor windings 4 to 6 or M1 to M3, respectively, to which three energy storages 18 to 20 are connected each via an inverter 14 to 16. Further, the optional bypass 13 bypassing the medium voltage grid choke 9 is not present. The energy storages 18 to 20 are two batteries 24 or battery banks and one flywheel 25 with a flywheel mass 28 coupled to the rotor 26 of an electric machine 27, here. The flywheel 25 may particularly be provided for short time providing varying electric power, whereas the batteries 24 provide a relatively constant basic power.

Many variations and modifications may be made to the preferred embodiments of the invention without departing substantially from the spirit and principles of the invention. All such modifications and variations are intended to be included herein within the scope of the present invention, as defined by the following claims.

We claim:
1. An apparatus for uninterruptible power supply comprising
a rotating electric machine having a generator winding and a plurality of motor windings, the motor windings of the plurality of motor windings being electrically insulated from the generator winding, and the motor windings of the plurality of motor windings being electrically insulated from one another, and,
for each motor winding of the plurality of motor windings, an energy storage for electric energy and an inverter outputting an alternating current, wherein the energy storage is connected to the respective motor winding via the inverter.

2. The apparatus of claim 1, wherein the motor windings of the plurality of motor windings are equal.

3. The apparatus of claim 1, wherein the motor windings of the plurality of motor windings and the inverters connected thereto are single phase.

4. The apparatus of claim 1, wherein the motor windings of the plurality of motor windings and the inverters connected thereto are three-phase.

5. The apparatus of claim 1, wherein the motor windings of the plurality of motor windings are configured for current feed at offset phases.

6. The apparatus of claim 5, wherein the inverters connected to the motor windings of the plurality of motor windings are synchronized with respect to one another.

7. The apparatus of claim 1, wherein the motor windings of the plurality of motor windings are configured for current feed at synchronous phases.

8. The apparatus of claim 7, wherein the inverters connected to the motor windings of the plurality of motor windings are synchronized with respect to one another.

9. The apparatus of claim 1, wherein the rotating electric machine is configured as a rotating transformer transforming motor alternating voltages that are present at the motor windings of the plurality of motor windings into a generator alternating voltage that is present at the generator winding and that is at least three times as high as the motor alternating voltages.

10. The apparatus of claim 1, wherein the generator winding has at least three times as many windings per phase as the motor windings of the plurality of motor windings.

11. The apparatus of claim 1, wherein the generator winding has at least five times as many windings per phase as the motor windings of the plurality of motor windings.

12. The apparatus of claim 1, wherein the generator winding has at least ten times as many windings per phase as the motor windings of the plurality of motor windings.

13. The apparatus of claim 12, wherein the inverters connected to the motor windings of the plurality of motor windings provide low voltages of less than 1,000 V as the motor alternating voltages at the motor windings of the plurality of motor windings, and wherein the electric machine outputs a medium voltage which is higher than the low voltage as a generator alternating voltage at the generator winding.

14. The apparatus of claim 1, wherein the generator winding is connected to a tap of a grid choke which is connectable between a supply grid and a load to be supplied with uninterrupted power.

15. The apparatus of claim 14, wherein the grid choke is a medium voltage grid choke which is connectable between a medium voltage grid and a medium voltage load and wherein the medium voltage is about 10 KV.

16. The apparatus of claim 1, wherein the electric machine is a synchronous machine having a common stator onto which the generator winding and the motor windings of the plurality of motor windings are wound, and a brushlessly excited rotor common for the generator winding and the motor windings of the plurality of motor windings.

17. The apparatus of claim 1, wherein the energy storages are selected from static and rotating energy storages.

18. The apparatus of claim 1, wherein a coupling is provided via which an output shaft of a combustion engine can be coupled to a rotor of the electric machine.

19. The apparatus of claim 1, wherein a coupling is provided via which an output shaft of a combustion engine is coupled to a rotor of the electric machine.

20. A device for uninterruptible power supply comprising
- a rotating electric machine having a generator winding and a plurality of motor windings, the motor windings of the plurality of motor windings being electrically insulated from the generator winding, and the motor windings of the plurality of motor windings being electrically insulated from one another, and,
- for each motor winding of the plurality of motor windings, an energy storage for electric energy and an inverter outputting an alternating current, wherein the energy storage is connected to the respective motor winding via the inverter,
- wherein the motor windings of the plurality of motor have equal turn numbers,
- wherein the generator winding, the motor windings of the plurality of motor windings and the inverters connected thereto are three-phase,
- wherein the inverters connected to the motor windings of the plurality of motor windings are synchronized with respect to one another,
- wherein the generator winding has at least ten times as many windings per phase as the motor windings of the plurality of motor windings.

* * * * *